United States Patent [19]

Goodrich

[11] 4,338,137

[45] Jul. 6, 1982

[54] ASPHALT COMPOSITION FOR AIR-BLOWING

[75] Inventor: Judson E. Goodrich, San Rafael, Calif.

[73] Assignee: Chevron Research Company, San Francisco, Calif.

[21] Appl. No.: 285,248

[22] Filed: Jul. 20, 1981

[51] Int. Cl.$^3$ ............................................. C08L 95/00
[52] U.S. Cl. ................................ 106/273 R; 106/279; 208/44
[58] Field of Search .............. 106/273 R, 279; 208/44

[56] References Cited

U.S. PATENT DOCUMENTS

| | | | |
|---|---|---|---|
| 1,720,487 | 7/1929 | Lichtenstern | 208/44 |
| 2,776,932 | 1/1957 | Hardman | 208/44 |
| 2,776,933 | 1/1957 | Gossen | 208/44 |
| 3,244,543 | 4/1966 | Lifson | 208/44 |

*Primary Examiner*—John Kight, III
*Assistant Examiner*—Amelia B. Yarbrough
*Attorney, Agent, or Firm*—D. A. Newell; J. M. Whitney; O. Todd Dickinson

[57] ABSTRACT

A process for air-blowing asphalt in the presence of ferrous chloride and an asphalt composition comprising a major amount of asphalt and a minor but effective amount of ferrous chloride.

10 Claims, No Drawings

ASPHALT COMPOSITION FOR AIR-BLOWING

BACKGROUND OF THE INVENTION

The invention relates to asphalt compositions. More specifically, the invention relates to asphalt compositions containing catalysts for the air-blowing of asphalt.

The asphalts in unprocessed form, i.e. naturally occurring or from petroleum refining, may be unsuitable for a given application because of excessive brittleness, insufficient penetration at a given softening point, and the like. A technique known as "air-blowing" was developed to modify the properties of the asphalts so that a desired penetration at a desired softening point can be achieved. Air-blowing raises the penetration of the asphalt at a given softening point.

Air-blowing is a process in which the asphalt is subjected to heat and mixing in the presence of a gas, such as air, oxygen or oxygen and an inert gas, and optionally a catalyst. The process raises the softening point and lowers the penetration of the asphalt.

Phosphorous sesquisulfide ($P_4S_3$), phosphorous pentasulfide ($P_2S_5$), $H_3PO_4$, $P_2O_5$ and ferric chloride ($FeCl_3$) are known asphalt air-blowing catalysts. Since the process of air-blowing is energy intensive and the catalysts can be expensive, it would be highly desirable to have an air-blowing catalyst which can be used in lower concentration than, for example, ferric chloride and/or exhibit an increased penetration point for a given softening point. It would also be desirable to have a catalyst with a lower chlorine content than $FeCl_3$, as the HCl which is given off as a byproduct can cause corrosion of metal vessels and contribute to air pollution. Increasing the penetration point at a given softening point gives a product which is flexible at low temperatures but does not flow at ambient temperatures.

SUMMARY OF THE INVENTION

I have invented an air-blowing asphalt composition comprising ferrous chloride and asphalt. The ferrous chloride imparts comparable or increased penetrations at preselected softening points to ferric chloride catalyzed air-blown asphalt. The ferrous chloride contains less chlorine than ferric chloride and can be used in concentrations which are less than or equal to the concentration of ferric chloride necessary to achieve a comparable penetration for a given softening point.

DETAILED DESCRIPTION OF THE INVENTION

Ferrous chloride, ($FeCl_2$), is added as an air-blowing catalyst to asphalt. The ferrous chloride is added in an amount of from about 0.01 weight percent to about 5 weight percent of the total catalyzed asphalt composition. Ferrous chloride accelerates the air-blowing reaction and provides equivalent or higher penetrations at a preselected softening point than ferric chloride and considerably higher penetrations than with no catalyst. This is surprising and unexpected because ferrous chloride is a reducing agent whereas ferric chloride is an oxidizing agent. The ferrous chloride can be in anhydrous or hydrated form such as $FeCl_2.4H_2O$.

The asphalt stock suitable for use can be of a varied character. Any petroleum residuum or flux, remaining following separation therefrom of vaporizable hydrocarbons through lubricating oil fractions or any relatively high molecular weight extract obtained from petroleum refining or virgin naturally occurring asphalt, can be used. For example, the residua from Alaskan North Slope/Waxy Light Heavy crude blend, Arabian Heavy crude, Arabian Light crude, and the like can be used. Of course, the difference in the asphalt stock will result in different properties of the finished air-blown asphalt.

The composition is fabricated by heating the asphalt to a temperature of about 200° to about 350° F. and thoroughly mixing the ferrous chloride in the asphalt to uniformly distribute the catalyst throughout the asphalt prior to air-blowing. Thereafter, the asphalt-ferrous chloride composition is air-blown in accordance with procedures known in the art such as those taught in U.S. Pat. Nos. 2,450,756; 2,762,755; and 3,126,329, said patents incorporated herein by reference.

More specifically, the asphalt is heated to a temperature of from about 400° F. to about 550° F. and air, oxygen or an oxygen-inert gas mixture is bubbled through the composition for sufficient time to achieve a preselected softening point. Generally, the air-blowing operation is carried out for a period of from about 0.5 hours to about 12 hours.

Air-blowing asphalt changes the properties of the asphalts. The air-blowing process increases the penetration for a given softening point so that the asphalt is less brittle and susceptible to cracking during thermal cycling. Thermal cycling is the change in temperature from hot to cold as might be encountered in asphalts used in roofing. The asphalt will get extremely hot from direct sunlight but will become extremely cold at night. To be an effective roofing asphalt, the asphalt must have a sufficiently high penetration so that it does not become brittle or crack during the thermal cycling and a sufficiently high softening point to remain viscous so that it will not run off the roof during hot days.

Having described the invention, the following examples are intended to be illustrative and not limit the scope of the invention. Modifications which would be obvious to the ordinary skilled artisan are contemplated to be within the scope of the invention.

EXAMPLE I

A solution of ferrous chloride was made up by dissolving 11.7 grams of $FeCl_2.4H_2O$ in 17.6 ml of water. The solution contained 25.5 wt. percent of $FeCl_2$ calculated on an anhydrous basis. The solution was added at a temperature of about 250° F. to 3000 grams of an asphalt having an kinematic viscosity of about 317.1 centistokes at 212° F. The concentration of $FeCl_2$ was about 0.25 grams per 100 grams of asphalt. Thereafter, the composition was heated to a temperature of about 300° F. to dehydrate the catalyst. The catalyzed asphalt was charged to an air-blowing still, heated to 500° F. with stirring, and a volume of air corresponding to about 0.1 standard cubic foot per minute was blown through the asphalt for about 106 minutes to achieve an air-blown asphalt composition having a softening point of about 191° F. with a penetration of about 20 deci-millimeters (dmm) at 77° F.

EXAMPLES II THROUGH IV

Air-blown products were produced in accordance with Example I, however the asphalt was blown for varying amounts of time as indicated in the Table below to produce air-blown products having softening points which increased with increasing blowing time and decreasing penetration as indicated in the table.

TABLE I

| Example | Air-Blowing Time (Min.) | Softening Pt. (°F.) | Penetration (dmm @ 77° F.) |
|---|---|---|---|
| II | 112 | 205 | 17 |
| III | 118 | 218 | 15 |
| IV | 126 | 230 | 12 |

Comparative Examples A-1 through A-4

The procedure outlined for Example I was carried out with respect to Examples A-1 through A-4, however, $FeCl_3.6H_2O$ was substituted for the $FeCl_2$ in an amount of about 0.58 grams per 100 grams of asphalt. The results are tabulated in Table II below.

TABLE II

| Example | Air-Blowing Time (Min) | Softening Pt. (°F.) | Penetration (dmm @ 77° F.) |
|---|---|---|---|
| A-1 | 105 | 192 | 19 |
| A-2 | 112 | 208 | 15 |
| A-3 | 116 | 217 | 14 |
| A-4 | 124 | 242 | 12 |

Comparative Examples B-1 through B-4

The procedures outlined with respect to Example I were carried out, however no air-blowing catalyst was added to the asphalt. The asphalts were air-blown for a sufficient time to achieve corresponding softening points to the softening points in the above examples. However, the uncatalyzed asphalt required much longer air-blowing times to achieve a corresponding softening point as indicated in Table III below.

TABLE III

| Example | Air-Blowing Time (Min) | Softening Pt. (°F.) | Penetration (dmm @ 77° F.) |
|---|---|---|---|
| B-1 | 154 | 188 | 14 |
| B-2 | 168 | 205 | 11 |
| B-3 | 179 | 218 | 9 |
| B-4 | 196 | 240 | 8 |

A comparison of the examples indicates that ferrous chloride is an effective catalyst for shortening the air-blowing times necessary to achieve a preselected softening point over uncatalyzed asphalts. In addition, with this specific asphalt, the ferrous chloride is superior to the ferric chloride in producing asphalts with higher penetrations for a given softening point. The effectiveness of the ferrous chloride is comparable to ferric chloride, although in other asphalts the penetration may be equal to or slightly lower than the penetration of ferric chloride with preselected softening points.

What is claimed is:

1. An asphalt composition comprising 0.01 weight percent to about 5 weight percent ferrous chloride and asphalt in an amount to equal 100 weight percent.

2. The composition according to claim 1 wherein the ferrous chloride is present in an amount of from about 0.10 to about 1 weight percent.

3. The composition according to claim 1 wherein the ferrous chloride is hydrated.

4. A process for producing blown asphalt which comprises air-blowing an asphalt in the presence of from about 0.01 weight percent to about 5 weight percent ferrous chloride for sufficient time to obtain a preselected softening point.

5. A process according to claim 4 wherein the temperature is maintained within a range of from about 400° to about 550° F.

6. A process according to claim 5 wherein the ferrous chloride is present in an amount of from about 0.1 weight percent to about 1 weight percent.

7. The process according to claim 6 wherein the air-blowing is carried out for a period of about 0.5–12 hours.

8. The process according to claim 7 wherein the ferrous chloride is added to the asphalt prior to air-blowing.

9. The process according to claim 8 wherein the ferrous chloride is hydrated.

10. The process according to claim 9 wherein the ferrous chloride is added to the asphalt at a temperature of from about 200° to about 350° F.

* * * * *